United States Patent
Su (10) Patent No.: US 10,283,343 B2
(45) Date of Patent: May 7, 2019

(54) DOUBLE-ENDED HIGH INTENSITY DISCHARGE LAMP AND MANUFACTURING METHOD THEREOF

(71) Applicant: Robert Su, Chino, CA (US)

(72) Inventor: Robert Su, Chino, CA (US)

(73) Assignee: Allstate Garden Supply, Chino, CA (US)

( * ) Notice: Subject to any disclaimer, the term of this patent is extended or adjusted under 35 U.S.C. 154(b) by 0 days.

(21) Appl. No.: 15/889,135

(22) Filed: Feb. 5, 2018

(65) Prior Publication Data

US 2018/0158668 A1 Jun. 7, 2018

Related U.S. Application Data

(63) Continuation-in-part of application No. 15/838,274, filed on Dec. 11, 2017, which is a continuation of application No. 15/368,654, filed on Dec. 4, 2016, now Pat. No. 9,875,886.

(51) Int. Cl.

| | |
|---|---|
| *H01J 61/82* | (2006.01) |
| *A01G 9/20* | (2006.01) |
| *H01J 9/24* | (2006.01) |
| *H01J 9/39* | (2006.01) |
| *H01J 9/32* | (2006.01) |
| *H01J 61/36* | (2006.01) |
| *H01J 61/34* | (2006.01) |
| *H01J 61/26* | (2006.01) |

(52) U.S. Cl.
CPC .............. *H01J 61/827* (2013.01); *A01G 9/20* (2013.01); *H01J 9/247* (2013.01); *H01J 9/323* (2013.01); *H01J 9/39* (2013.01); *H01J 61/26* (2013.01); *H01J 61/34* (2013.01); *H01J 61/366* (2013.01)

(58) Field of Classification Search
CPC .. H01J 61/827; H01J 9/323; H01J 9/39; H01J 9/247; H01J 61/366; H01J 61/26; H01J 61/34; A01G 9/20
See application file for complete search history.

(56) References Cited

U.S. PATENT DOCUMENTS

| | | | |
|---|---|---|---|
| 2006/0076869 A1* | 4/2006 | Marien | H01J 5/54 313/317 |
| 2013/0278130 A1* | 10/2013 | Lucz | H01J 61/327 313/17 |

FOREIGN PATENT DOCUMENTS

| | | | |
|---|---|---|---|
| CN | 201706412 | * 1/2011 | H01J 61/12 |

* cited by examiner

*Primary Examiner* — Donald L Raleigh
(74) *Attorney, Agent, or Firm* — Raymond Y. Chan; David and Raymond Patent Firm (57) ABSTRACT

A double-ended high intensity discharge lamp includes a luminous tube which comprises an inner tube and an outer tube. At least one electrical member is securely fastened inside the luminous tube and at least one illuminator supported inside the luminous tube with a distributor connected with the electrical member to receive power and supply the illuminator. The outer tube is another protective shield to stop spreading in explosion of the illuminator.

18 Claims, 5 Drawing Sheets

DOUBLE-ENDED HIGH INTENSITY DISCHARGE LAMP AND MANUFACTURING METHOD THEREOF

CROSS REFERENCE OF RELATED APPLICATION

This application is a Continuation-In-Part application that claims the benefit of priority under 35 U.S.C. § 120 to a non-provisional application, application Ser. No. 15/838,274, filed Dec. 11, 2017, which is a Continuation application that claims the benefit of priority under 35 U.S.C. § 120 to a non-provisional application Ser. No. 15/368,654, filed Dec. 4, 2016. The afore-mentioned patent applications are herewith by references in their entities.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to lighting device, and more particularly to a double-ended high intensity discharge lamp and manufacturing method thereof, which can provide a ceramic metal halide lamp or a high-pressure sodium lamp.

Description of Related Arts

Double-ended high intensity discharge lamps, such as HPS, MH, and LED, are commonly used in large area lighting application, and especially for the indoor growers, the above mentioned HID lamps are commonly used to grow corps without using sunlight indoors. In the current market, the ceramic metal halide lamps are provided in the market which can be used to provide efficient crop light that allows more harvest for less power. Compared with the other HID lamps, the ceramic metal halide lamps, for example, can be operated at higher temperature which is adapted to boost performance and quality-of-light characteristics, such as lumen maintenance, lamp color-shift and spread stability, color rendering index, and dimming.

However, the ceramic metal halide lamps have several drawbacks. Since the ceramic metal halide lamps are operated under a high temperature, throughout their lifetime, the light output of the ceramic metal halide lamps is gradually reduced, and the power consumption is gradually increased. Therefore, 315 W ceramic metal halide lamps are commonly used and limited in our daily life, and a higher wattage ceramic metal halide lamp is highly desired to provide to satisfy our daily life requirement.

The conventional high intensity discharge lamp comprises a hard glass bulb, which is easily to be broken by hitting or heating, an illuminator inside the bulb, and a plurality of electrical elements mounted outside the glass bulb to be threatened by being damaged. In case the illuminator of the halide is exploded by accident which causes the bulb is broken, the harmful substances inside the illuminator spread to the outside to be harmful to people health. It is worth to mention that the illuminator is connected by the electrical elements with outside, so the electrical elements are suffered through heat changing in the bulb which effects the lifetime by stretching wires of the electrical elements.

SUMMARY OF THE PRESENT INVENTION

The invention is advantageous in that it provides a double-ended high intensity discharge lamp and manufacturing method thereof, wherein the high intensity discharge lamp is capable of stopping spread of substances which is harmful to health which exploded accidentally.

Another advantage of the invention is to provide a double-ended high intensity discharge lamp and manufacturing method thereof, wherein the high intensity discharge lamp provides a ventilated channel on the luminous tube to receive the spread substances.

Another advantage of the invention is to provide a double-ended high intensity discharge lamp and manufacturing method thereof, wherein the luminous tube in formed by at least two covered tubes.

Another advantage of the invention is to provide a double-ended high intensity discharge lamp and manufacturing method thereof, wherein the high intensity discharge lamp comprises at least one electrical member securely fastened in a luminous tube to enhance the efficiency of operation and avoid damages to the electrical member.

Another advantage of the invention is to provide a double-ended high intensity discharge lamp and manufacturing method thereof, wherein the high intensity discharge lamp comprises at least one illuminator supported inside the luminous tube with a distributor to increase the stability of connection between the illuminator and electrical member.

Another advantage of the invention is to provide a double-ended high intensity discharge lamp, wherein the electrical member further comprises at least two terminals which are permanently fixed in two sealing ends of the luminous tube to seal the luminous tube and decrease stretching damage by heat expansion and contraction.

Another advantage of the invention is to provide a double-ended high intensity discharge lamp, wherein the luminous tube is made of quartz which has non-friable performance to protect the illuminator therein.

The invention is advantageous in that it provides a double-ended high intensity discharge lamp and manufacturing method thereof, wherein the high intensity discharge lamp comprises at least two illuminators serially connected with each other to provide a high wattage lamp without alter the overall structure for the conventional double-ended high intensity discharge lamp.

Another advantage of the invention is to provide a double-ended high intensity discharge lamp, wherein the illuminators are 315 W high intensity discharge lamp, so a total wattage of all illuminators is 945 W.

Another advantage of the invention is to provide a double-ended high intensity discharge lamp and manufacturing method thereof, wherein the high intensity discharge lamp comprises a plurality of U-shaped connectors arranged on two opposed ends of each illuminators to provide buffering clearances and buffering forces for connections between two illuminators.

Another advantage of the invention is to provide a double-ended high intensity discharge lamp and manufacturing method thereof, wherein the high intensity discharge lamp comprises at least two getters attached on one of two U-shaped connectors between the two illuminators to absorb excess hydrogen, so as to protect the functions of the double-ended high intensity discharge lamp.

Another advantage of the invention is to provide a double-ended high intensity discharge lamp and manufacturing method thereof, wherein the high intensity discharge lamp comprises at least two ring-shaped retainers extended through one of the U-shaped connectors to an adjacent U-shaped connector to bias against an inner wall of the luminous tube to support the illuminators arranged along a central line of the luminous tube.

Another advantage of the invention is to provide a double-ended high intensity discharge lamp, wherein two opposed ends of the luminous tube are sealed and a vacuum space is formed inside the luminous tube to protect functions of the illuminators.

Another advantage of the invention is to provide a double-ended high intensity discharge lamp, wherein the overall structure of the double-ended high intensity discharge lamp doesn't nor alter in order to satisfy the above mentioned advantages, so there is no need to purchase new ballasts and fixtures for replacing the original lamp device into the present invention.

Additional advantages and features of the invention will become apparent from the description which follows, and may be realized by means of the instrumentalities and combinations particular point out in the appended claims.

According to the present invention, the foregoing and other objects and advantages are attained by a high intensity discharge lamp, comprising:

a luminous tube;

at least two illuminators serially connected with each other deposed inside the luminous tube; and at least one ring-shaped retainers arranged between two illuminators to support said illuminators located along a central line of the luminous tube.

In accordance with another aspect of the invention, the present invention comprises a manufacturing method for a double-ended high intensity discharge lamp, comprising the following steps:

(1) Arrange at least two serially connected illuminators inside an interior of a luminous tube.

(2) Seal two ends of luminous tube by a press sealing technique.

(3) Extract out the gas inside the luminous tube to form an eyelet at a central portion of the luminous tube.

In accordance with another aspect of the invention, the present invention provides a double-ended high intensity discharge lamp, comprising:

a luminous tube comprising an inner tube and an outer tube coaxially formed around the inner tube;

at least one electrical member securely fastened inside the luminous tube; and at least one illuminator supported inside the luminous tube with a distributor connected with the electrical member to receive power and supply the illuminator.

According to one embodiment of the present invention, the outer tube is a protective shield arranged to stop spreading in explosion of the illuminator.

According to one embodiment of the present invention, the terminals of the electrical member is sealed in the sealing ends by melting the luminous tube to permanently fasten the electrical member in the luminous tube.

According to one embodiment of the present invention, the sealing ends are preferably in smaller size than the other portion of the luminous tube so as to form the arch-shape of the luminous tube.

According to one embodiment of the present invention, the distributor is connected with the illuminator and one of the terminals to distribute the stress of stretch the illuminator while changing temperature in the luminous tube.

In accordance with another aspect of the invention, the present invention provides a manufacturing method of the double-ended high intensity discharge lamp, comprising the steps of:

A. preparing an inner tube with an inner opening;

B. melting an outer tube with a ventilated channel outside the inner tube to form a luminous tube;

C. arranging the illuminator with a connector, a getter, a retainer and a distributor inside the luminous tube;

D. melting to seal the terminals in sealing ends of the luminous tube;

E. extracting gas inside the luminous tube via the ventilated channel; and

F. sealing the ventilated channel on the outer tube.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
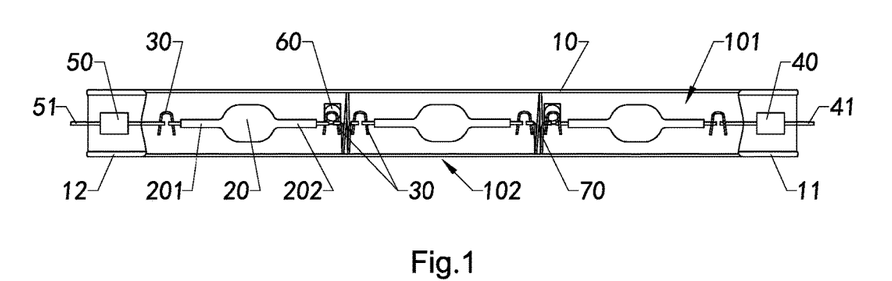
FIG. 1 is a sectional view of a double-ended high intensity discharge lamp according to a first preferred embodiment of the present invention.

Referring to FIG. 1 of the drawings, a double-ended high intensity discharge lamp according to a first preferred embodiment of the present invention is illustrated, wherein the double ended high intensity discharge lamp comprises a luminous tube 10 having two sealed ends 11, 12 to define an interior 101, at least two illuminators 20 serially connected arranged along a central line Y of the luminous tube 10 and deposed inside the interior 101, and at least four U-shaped connectors 30 adapted to provide electrical connection between each of the illuminators 20.

Accordingly, each of the illuminators 20 is arc-tube having a wall formed of a ceramic or other suitable material, wherein each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage, wherein each of the illuminators 20 are conventional ceramic metal halide lamps, which comprises an ionizable fill disposed in an interior space of the illuminator 20, the ionizable fill comprising an inert gas and a halide component, and two electrodes positioned within the discharge vessel so as to energize the fill when an electric current is applied thereto. It is worth to mention that each of the illuminators 20 is a 315 W ceramic metal halide lamp, so if three of the illuminators 20 are serially connected with each other, the total energy used of the present invention is 945 W.

It is worth mentioning that the interior of the luminous tube 10 is a vacuum space to insulate the illuminators 20, so after the two sealed ends 11, 12 are sealed by press sealing technique, the gas inside the interior of the luminous tube 10 is extracted out to form the vacuum space from a central of the luminous tube 10 to from an eyelet. The press sealing techniques are well known in the art. And, each of the two sealed ends 11, 12 of the luminous tubes 10 is formed as a square tab adapted to engage with a socket of a lamp holder of an external fixture. It is worth to mention that the structure of the luminous tube 10 is the same as the conventional 1000 W high pressure sodium lamp, so the double-ended ceramic metal halide of the present invention can be installed on the ballast and fixture designed for the conventional 100 W high pressure sodium lamp, so no additional ballasts and fixtures are required to purchase in order to replace the 1000 W high pressure sodium lamp to 945 W double-ended ceramic metal lamps.

The high intensity discharge lamp further comprises a first terminal 40 and a second terminal 50 formed on two sealed ends 11, 12 of the luminous tubes 10, and two electrical leads 41, 51 are extended from the two opposed ends 201, 202 of the illuminators 20 through the first and second terminals 40, 50 respectively. The two electrodes of each of the illuminators 20 are serially connected with each other to form the two opposed ends 201, 202 of the illuminators, and are connected through the two sealed ends 11, 12 of the illuminous tubes 10 to two electrical leads 41, 51 respectively.

Accordingly, the U-shaped connectors 30 are arranged on two opposed ends 201, 202 of each of the illuminators 20, wherein each of the U-shaped connectors 30 provides a buffering clearance between the two illuminators 20, so a buffering force is provided from each of the U-shaped connector 30. During the manufacturing of the high intensity discharge lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

The high intensity discharge lamp further comprises at least two getters 60, wherein each of the getters 60 is arranged between two illuminators 20 and attached on one of the U-shaped connectors 30 arranged between two illuminators 20. Therefore, the U-shaped connectors 30 can define a supporting surface to provide the getters 60 attached thereon, and the getters 60 are adapted to absorb excess hydrogen, so as to protect the function of the high intensity discharge lamp of the present invention.

Accordingly, the high intensity discharge lamp further comprises at least two ring-shaped retainers 70 connected between two U-shaped connectors 30, wherein each of ring-shaped retainers 70 is extended through one of the U-shaped connectors 30 to the other of the U-shaped connectors 30 to bias against an inner wall of the luminous tube 20. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube.

Figure 7:
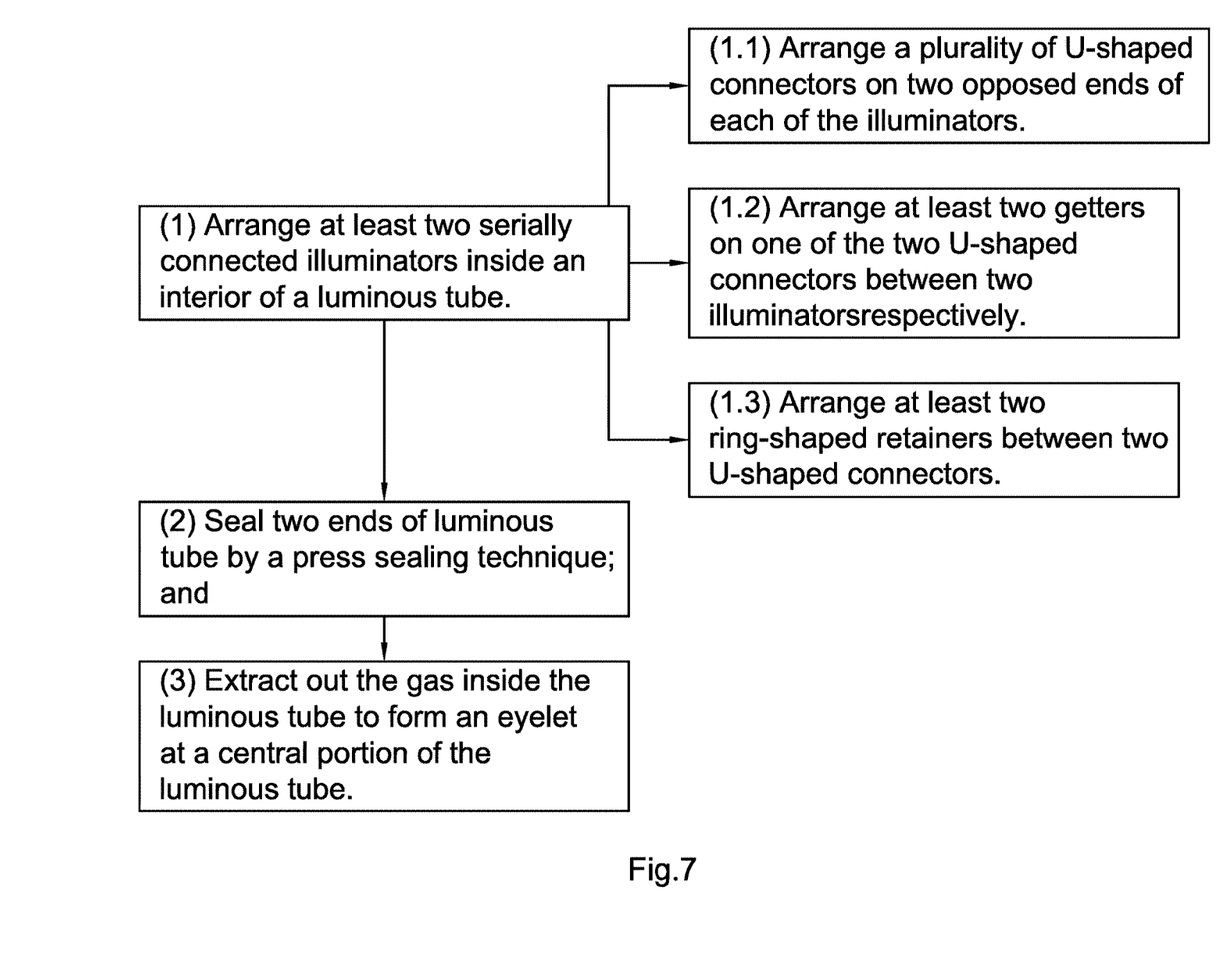
FIG. 7 is a block diagram of a manufacturing method of the double-ended high intensity discharge lamp according to the above first preferred embodiment of the present invention.

A manufacturing method of a double-ended high intensity discharge lamp according to the first preferred embodiment of the present invention is illustrated as in FIG. 7, wherein the manufacturing method comprises the following steps:

(1) Arrange at least two serially connected illuminators 20 inside an interior of a luminous tube 10.

(2) Seal two ends of luminous tube 10 by a press sealing technique.

(3) Extract out the gas inside the luminous tube 10 to form an eyelet 102 at a central portion of the luminous tube 10.

In the step (1), the illuminators 10 are arc-tubes, which are ceramic hadlide discharge tube, and which comprises an ionizable fill disposed in an interior space of the illuminators 20, the ionizable fill comprising an inert gas and a halide component, and two electrodes positioned within the discharge vessel so as to energize the fill when an electric current is applied thereto.

Accordingly, the manufacturing method further comprises a step (1.1): Arrange a plurality of U-shaped connectors 30 on two opposed ends of each of the illuminators 20, wherein the U-shaped connectors 30 not only provide electrical connection between each of the illuminators 20, but also provide buffering clearances between the two illuminators 20, so a buffering force is provided from each of the U-shaped connectors 30. During the manufacturing of the high intensity discharge lamp of the present invention, the U-shaped connectors 30 are adapted to reinforce serially connections between each of the illuminators 20, and further prevent the break of the connections between each of the illuminators 20 due to the buffering force generated from the U-shaped connectors 30.

Accordingly, the manufacturing method further comprises a step (1.2) of arranging at least two getters 60 on one of the two U-shaped connectors 30 between two illuminators 20 respectively. Therefore, the U-shaped connectors 30 can define a supporting surface to provide the getters 60 attached thereon, and the getters 60 are adapted to absorb excess hydrogen, so as to protect the function of the high intensity discharge lamp of the present invention.

Accordingly, the manufacturing method further comprises a step (1.3) of arranging at least two ring-shaped retainers 70 between two U-shaped connectors 30, wherein each of ring-shaped retainers 70 is extended through one of the U-shaped connectors 30 to the adjacent U-shaped connectors 30 to be biased against an inner wall of the luminous tube 10. In order to prevent the damage of the illuminators 20 and the luminous tube 10, the illuminators 20 are required to arrange along a central line of the luminous tube 10, so the ring-shaped retainers 70 are adapted to support the illuminators 20 arranged along the central line of the luminous tube 10.

In the step (2), each of the illuminators 20 has two opposed ends 201, 202 to receive current from the U-shaped conductors 30. The illuminators 20 are surrounded by the luminous tube 10, and two sealed ends 11, 12 of the luminous tube 10 are selectively connected with a source of power, such as voltage.

In the step (2), each of the two sealed ends 11, 12 of the luminous tubes 10 is formed as square tabs adapted to engage with a socket of a lamp holder of an external fixture. The press sealing techniques are well known in the art.

In the step (3), the interior of the luminous tube 10 is a vacuum space to insulate the illuminators.

Figure 2:
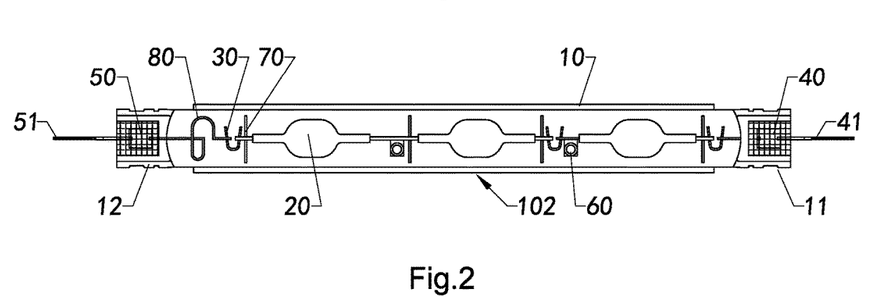
FIG. 2 is a sectional view of the double-ended high intensity discharge lamp according to the above first preferred embodiment of the present invention.

Furthermore, the high intensity discharge lamp further comprises at least one distributor 80 disposed between the illuminator 20 and the luminous tube 10, so that the force applied on the illuminator 20 is transformed to the distributor 80 to decrease the stretch force for avoiding damaging the illuminator 20 by pulling or pushing. In other words, the double-ended high intensity discharge lamp further comprises a plurality of electrical elements which connected the illuminator 20 and supply power to the illuminator 20. As shown in FIG. 2, the electrical elements further comprise the connectors 30, the terminals 40, 50 and the distributor 80. It is worth to mention that the connectors 30 are connected the illuminator 20 with the terminals 40, 50 on each end 201, 202 of the illuminator 20. And the connector 30 is electrically supplied power to the illuminator 20. The terminals 40, 50 are preferably to be ballasts for the illuminator 20 which helps conduct electrical power for the illuminator 20 operating. The distributor 80 is disposed between the connector 30 and one of the terminals 40, 50 in the embodiment.

As shown in FIG. 2, the distributor 80 is extended from the terminal 40 to the connector 30 on the end of the illuminator 20. The distributor 80 further comprises at least two curved stress distributing arms 81 which forms at least two distributing cavities 82 respectively. The distributing arms 81 are integrally formed in curved line shape extended from the connector 30 to the terminal 40. As the temperature inside the luminous tube 10 is changed by operating of the illuminator 20, the distributing arms 81 are pulled or pushed to change the volume of the distributing cavities 82 for buffering the stretching stress caused by heat expansion and contraction. Each of the distributing arms 81 is shaped in U-type with a distributing opening 83 to communicate the distributing cavity 82. In other words, the distributing opening 83 can be stretched instead of the illuminator 20 during changing temperature.

In the embodiment, there are two distributing arms 81 disposed against with each other with the distributing arms 81 in substantial spiral shape. As the illuminator 20 is bearing the heat expansion and contraction, the force applied on the illuminator 20 is transformed on the distributing arms 81. Therefore, the illuminator 20 is protected during operation to avoid being stretched to be damaged.

The illuminators 20, in the first preferred embodiment, are ceramic metal halide lamps. In an alternative mode of the embodiment, the illuminators 20 are high pressure sodium lamps, which the luminous tube 10 and the electrical members are correspond to the type of the illuminators 20. The retainers 70 are supporting the illuminators 20 to be steady inside the luminous tube 10 with the terminals 40, 50 sealed in the sealing ends 11, 12. The illuminators 20 are hold by the retainers 70 to have relatively static stability against the luminous tube 10 and by the connectors 30 and the distributor 80 to have dynamic stability against with each other while operated. The connectors 30, the terminals 40, 50 and the distributor 80 are preferably made of conductive metal.

A second preferred embodiment of the present invention is illustrated in FIG. 3 to FIG. 6. Unlike the above first preferred embodiment, there is only one illuminator 20' is supported in the luminous tube 10'. However, the illuminator 20' is also supported by the retainer 70' and connected with the connectors 30' to the terminal 40', 50' which is similar to the above first preferred embodiment.

Figure 3:
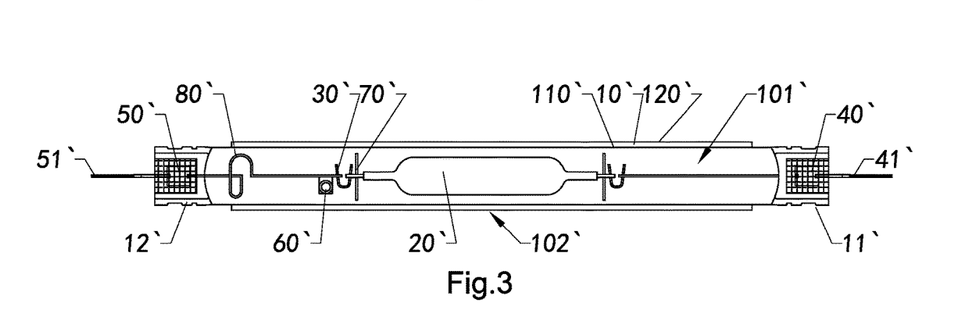
FIG. 3 is a sectional view of the double-ended high intensity discharge lamp according to a second preferred embodiment of the present invention.

It is worth to mention that the shape of the retainer 70' is preferably to be adapted for the luminous tube 10' to be supported against the inner surface of the luminous tube 10'. The retainer 70' is a substantially ellipse frame to hold the illuminator 20' in a central position of the luminous tube 10'. And two getters 60' are mounted on two opposite ends of the illuminator 20' to be adapted to absorb excess hydrogen. Since the retainers 70' are preferably disposed near the ends of the illuminator 20', the getters 60' are adapted to be set near the retainers 70' respectively.

In order to avoid damaging the illuminator 20' in changing temperature, at least one distributor 80' is preferably extended from one of the terminals 40', 50' to the connector 30' for being stretched. Furthermore, the eyelet 102' is positioned on the center of the luminous tube 10' for better extracting the gas effectively to form vacuum inside the luminous tube 10'. The eyelet 102' is sealed after forming vacuum environment.

It is worth to mention that the luminous tube 10' comprises an inner tube 110' and an outer tube 120' formed coaxially around and extended along a length of the inner tube 110'. In other words, the illuminator 20' is double-covered by both the inner tube 110' and the outer tube 120' to avoid the gas leak. The outer tube 120' covers the inner tube 110' in an end-to-end manner, wherein a ventilated channel 130' is formed between the inner tube 110' and the outer tube 120'. Accordingly, the inner tube 110' and the outer tube 120' are not overlapped completely with the ventilated channel 130' acting as shock absorbers. As the manufacturing of the high intensity discharge lamp is ended with sealing the eyelet 102', the ventilated channel 130' is sealed from the outside. In case the illuminator 20' is exploded by accident that causes the inner tube 110' being broken or bursted, the harmful substances inside the illuminator 20' spread to the ventilated channel 130'. The outer tube 120' is a protective shield for the inner tube 110'. And, the outer tube 120' is connected with the inner tube 110' at two ends thereof, resulting in less suffer from impact directly while the outer tube 120' remaining unbroken and blocking the harmful substances, such as mercury.

Figure 4:
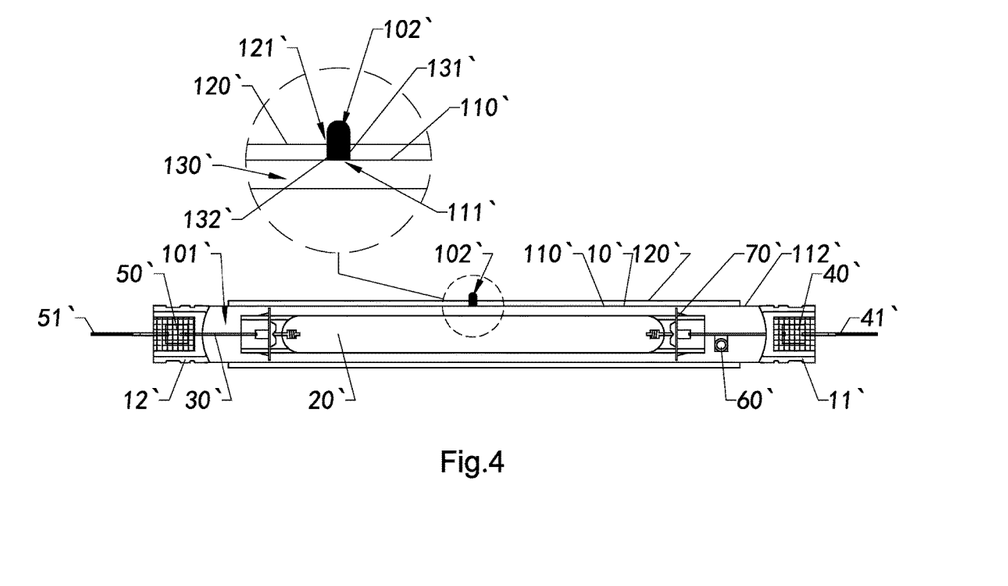
FIG. 4 is a sectional view of the double-ended high intensity discharge lamp according to the above second preferred embodiment of the present invention.
Figure 5:
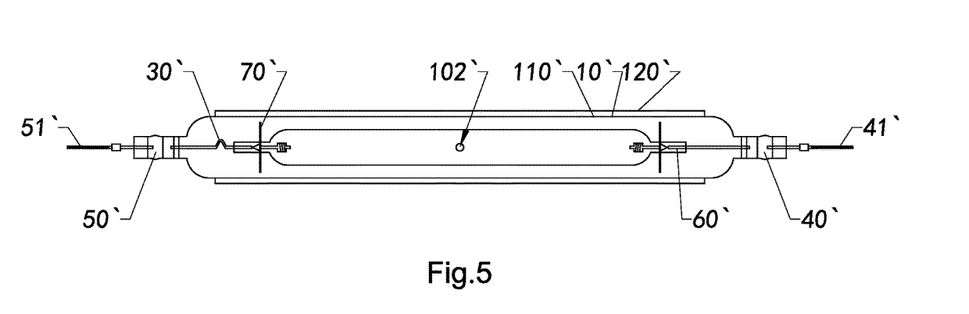
FIG. 5 is a sectional top view of the double-ended high intensity discharge lamp according to the above second preferred embodiment of the present invention.

More specifically, as shown in FIG. 4 and FIG. 5, the inner tube 110' has an inner opening 111' and the outer tube 120' has an outer opening 121'. The ventilated channel 130' defined between the inner tube 110' and the outer tube 120' and the inner opening 111' communicates with the outer opening 121' through the ventilated channel 130'. Accordingly, the air pressure in the inner tube 110' and the outer tube 120' are balanced by the inner opening 111'. The luminous tube 101 further comprises a sealing member 132' arranged to seal the outer opening 121' finally so as to seal the whole luminous tube 10' from outside. In the second preferred embodiment, the outer tube 120' is mounted with a gas stem 131' to extract the gas in the ventilated channel 130' through the outer opening 121' and the inner opening 111'.

Preferably, the inner tube 110' and the outer tube 120' are made of ultraviolet-proof quartz.

Figure 6:
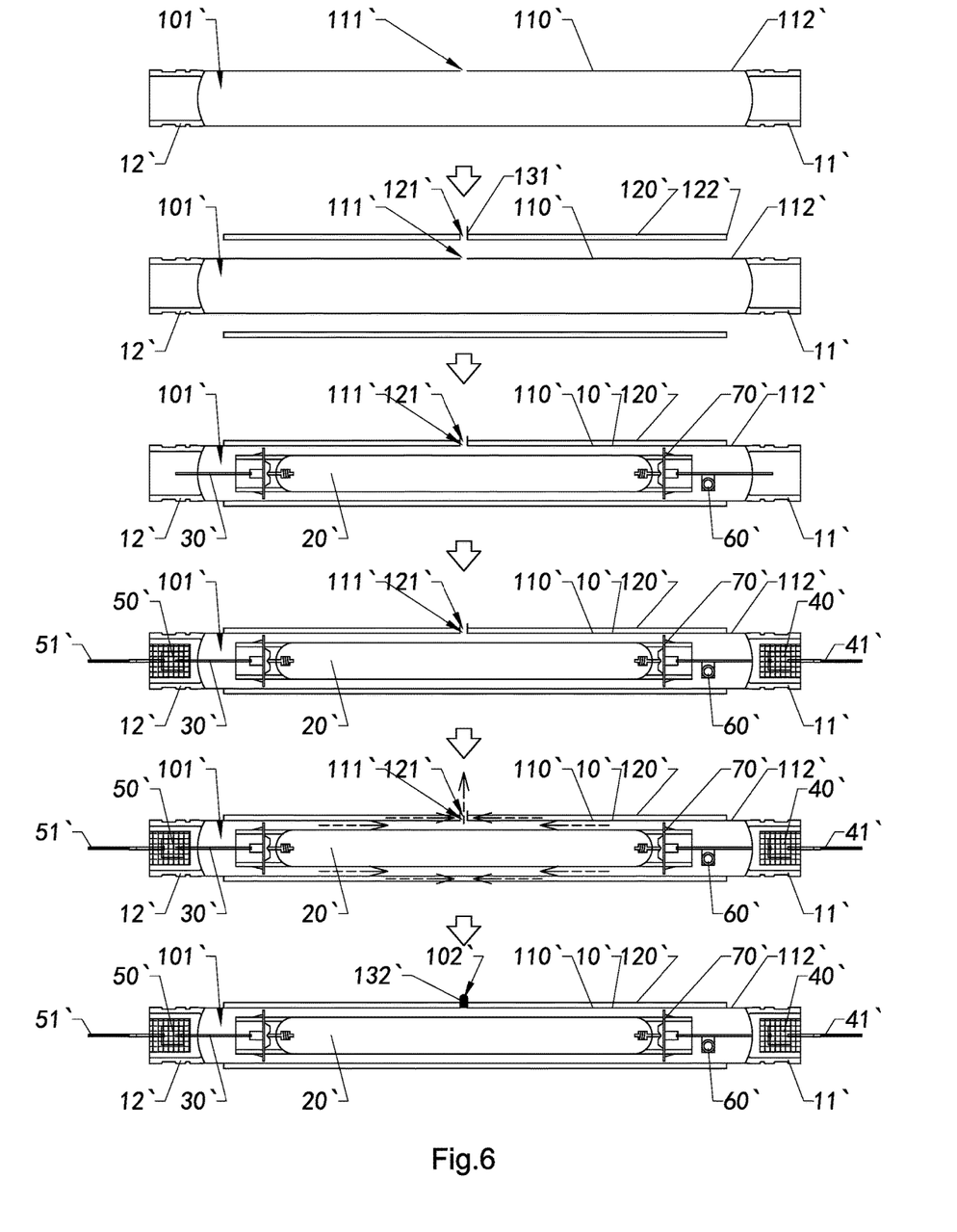
FIG. 6 illustrates a manufacturing method of the double-ended high intensity discharge lamp according to the above second preferred embodiment of the present invention.
Figure 8:
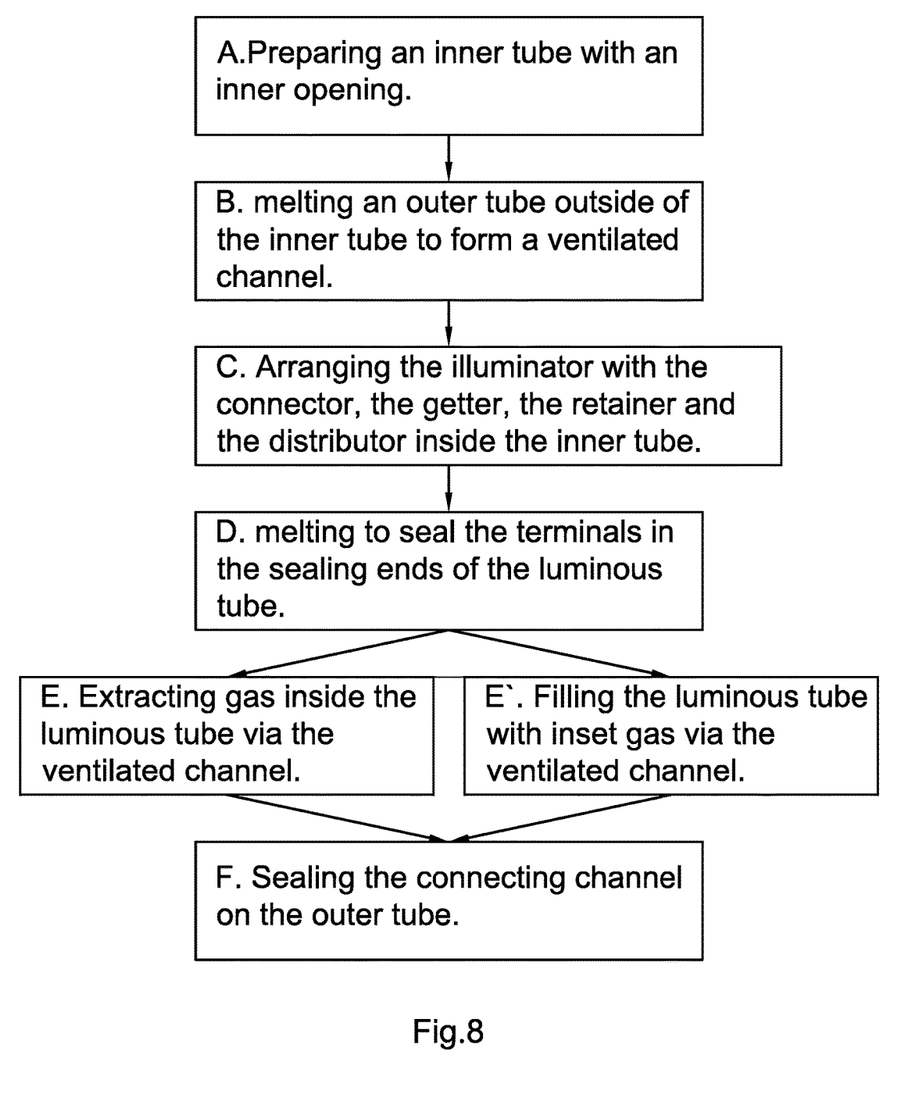
FIG. 8 is a block diagram of a manufacturing method of the double-ended high intensity discharge lamp according to the above second preferred embodiment of the present invention.

The manufacturing method of the double-end high intensity discharge lamp according to the second preferred embodiment of the present invention is illustrated in FIG. 6 and FIG. 8, wherein the manufacturing method comprises the steps of:

A. preparing the inner tube 110' with the inner opening 111';

B. melting the outer tube 120' with the outer opening 121' outside the inner tube 110' to define the ventilated channel 130' between the inner tube 110' and the outer tube 120', wherein the outer tube 120' is formed coaxially around and extended along a length of the inner tube 110';

C. arranging the illuminator 20' with the connector 30', the getter 60', the retainer 70' and the distributor 80' inside the inner tube 110' of the luminous tube 10';

D. melting to seal two terminals 40', 50' in two sealing ends 11', 12' of the luminous tube 10' respectively;

E. extracting gas inside the luminous tube 10' through the outer opening 121', the inner opening 111' and the ventilated channel 130'; and F. sealing the ventilated channel 130' by sealing at least the outer opening of the outer tube 120'.

More specifically, the step A further comprises a step A1 of mounting the gas stem 131' to the outer opening 121' of the outer tube 120'. The gas stem 131' may also use to align the inner opening 111' of the inner tube 110' and the outer opening 121' of the outer tube 120', wherein the outer opening 121' of the outer tube 120' communicates the inner opening 111' of the inner tube 110' through the ventilated channel 130'.

More specifically, the step B further comprises the steps of:

B1. melting two brim ends 122' of the outer tube 120'; and

B2. attaching the melted brim ends 122' of the outer tube 120' to two joining portion 112' of the inner tube 110'.

It is worth to mention that, after the step B, the inner tube 110' and the outer tube 120' are melted together at the brim ends 122' by integrating the brim ends 122' with the joining portion 112' so that the ventilate channel 130' is formed between the inner tube 110' and the outer 120' and extended between the two brim ends 122' and the two joining portion 112'.

In other words, for manufacturing the high intensity discharge lamp, firstly, the inner tube 110' with the inner opening 111' is prepared and the gas stem 131' is mounted to the outer opening 121' of the outer tube 120'. And then, the two brim ends 122' of the outer tube 120' are melted and aligned with the two joining portions 112' of the inner tube 110' respectively. Then, the melted brim ends 122' of the outer tube 120' are attached to and integrated with two joining portions 112' of the inner tube 110'. Preferably, the gas stem 131' is arranged corresponding to the inner opening 111' while integrating the brim ends 122' to the joining portions 112'. After the step B, the luminous tube 10' is formed by two covered tubes in an end-to-end manner with the ventilated channel 130' formed in the luminous tube 10'.

Then, the illuminator 20' is arranged with the connector 30', the getter 60', the retainer 70' and the distributor 80' inside the luminous tube 10'. In other words, the electrical members are mounted inside the luminous tube 10'. Then, the two terminals 40', 50' are melted to seal in the sealing ends of the luminous tube. It is worth mentioning that the electrical leads 41', 51' are extended from the terminals 40', 50' respectively to the outside of the luminous tube 10' while the terminals 40', 50' are sealedly mounted in the sealing ends 11', 12' respectively to seal the luminous tube 10'.

After the sealing ends 11', 12' are sealed, the gas inside the luminous tube 10' is extracted through the outer opening 121' to keep the ventilated channel 130' without gas such as oxygen. Finally, sealing the ventilated channel 130' on the outer tube 120' permanently by sealing the outer opening 121' of the outer tube 120' with the sealing member 132'. Preferably, the sealing member 132' is made of quartz or thermosetting material to fit the outer opening 121' of the outer tube 120'. In other words, the gas in the ventilated channel 130' is extracted and contains no oxygen in the step E. In an alternative mode of the second preferred embodiment, the manufacturing method may further comprise a step of:

E'. filling the ventilated channel 130' with inset gas through the outer opening 121' of the outer tube 120'. The step E' is a substitute step for the step E which is also operated through the outer opening 121' to keep the inner environment in inert condition.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A manufacturing method of a double-end high intensity discharge lamp, comprising the steps of:

A. preparing an inner tube with an inner opening;

B. melting an outer tube with an outer opening outside said inner tube to define a ventilated channel between said inner tube and said outer tube, wherein said outer tube is formed coaxially around and extended along a length of said inner tube, wherein said outer opening of said outer tube communicates with said inner opening of said inner tube through said ventilated channel;

C. arranging at least one illuminator supported in said luminous tube, at least one electrical member securely fastened in said luminous tube and at least a distributor connecting said at least one illuminator with said at least one electrical member to receive power and supply said at least one illuminator;

D. melting to seal two terminals in two sealing ends of said luminous tube respectively;

E. extracting gas inside said luminous tube through said inner opening, said outer opening and said ventilated channel; and F. sealing said ventilated channel by sealing at least said outer opening of said outer tube.

2. The manufacturing method, as recited in claim 1, wherein the step A further comprises a step of:

A1. mounting a gas stem to said outer opening of the outer tube.

3. The manufacturing method, as recited in claim 1, wherein the step B further comprises the steps of:

B1. melting two brim ends of said outer tube; and

B2. attaching said melted brim ends of said outer tube to two joining portion of said inner tube.

4. The manufacturing method, as recited in claim 2, wherein the step B further comprises the steps of:

B1. melting two brim ends of said outer tube; and
B2. attaching said melted brim ends of said outer tube to two joining portion of said inner tube.

5. A manufacturing method of a double-end high intensity discharge lamp, comprising the steps of:
A. preparing an inner tube with an inner opening;
B. melting an outer tube with an outer opening outside said inner tube to define a ventilated channel between said inner tube and said outer tube, wherein said outer tube is formed coaxially around and extended along a length of said inner tube, wherein said outer opening of said outer tube communicates with said inner opening of said inner tube through said ventilated channel;
C. arranging at least one illuminator supported in said luminous tube, at least one electrical member securely fastened in said luminous tube and at least a distributor connecting said at least one illuminator with said at least one electrical member to receive power and supply said at least one illuminator;
D. melting to seal two terminals in two sealing ends of said luminous tube respectively;
E. filling said ventilated channel with inset gas through said outer opening of said outer tube; and
F. sealing said ventilated channel by sealing at least said outer opening of said outer tube.

6. The manufacturing method, as recited in claim 5, wherein the step A further comprises a step of:
A1. mounting a gas stem to said outer opening of the outer tube.

7. The manufacturing method, as recited in claim 5, wherein the step B further comprises the steps of: B1. melting two brim ends of said outer tube; and B2. attaching said melted brim ends of said outer tube to two joining portion of said inner tube.

8. The manufacturing method, as recited in claim 6, wherein the step B further comprises the steps of:
B1. melting two brim ends of said outer tube; and
B2. attaching said melted brim ends of said outer tube to two joining portion of said inner tube.

9. A double-ended high intensity discharge lamp, comprising:
a luminous tube which comprises an inner tube and an outer tube formed coaxially around and extended along a length of said inner tube;
at least one illuminator supported inside said luminous tube, wherein said luminous tube forms a ventilated channel between said inner tube and said outer tube as a protective shielding adapted to stop spreading in explosion of said illuminator; and
a plurality of electrical members securely fastened in said luminous tube, wherein said electrical members are connected to said illuminator to supply power to operate said illuminator, wherein each of said electrical members further comprises at least two terminals which are permanently fixed in two sealing ends of said luminous tube respectively, wherein said inner tube has an inner opening and said outer tube has an outer opening, wherein said outer opening of said outer tube communicates with said inner opening of said inner tube through said ventilated channel.

10. The double-ended high intensity discharge lamp, as recited in claim 9, wherein said outer tube covers said inner tube in an end-to-end manner and said ventilated channel is formed to communicate between said inner tube and said outer tube.

11. The double-ended high intensity discharge lamp, as recited in claim 9, further comprising a sealing member arranged to seal said outer opening so as to seal said luminous tube from outside.

12. The double-ended high intensity discharge lamp, as recited in claim 10, further comprising a sealing member arranged to seal said outer opening so as to seal said luminous tube from outside.

13. The double-ended high intensity discharge lamp, as recited in claim 9, wherein said inner tube has two joining portion at two end portions and said outer tube has two brim ends melted to attach at said two joining portion respectively so as to integrate said outer tube with said inner tube together and define said ventilate chamber between said outer tube and said inner tube.

14. The double-ended high intensity discharge lamp, as recited in claim 10, wherein said inner tube has two joining portion at two end portions and said outer tube has two brim ends melted to attach at said two joining portion respectively so as to integrate said outer tube with said inner tube together and define said ventilate chamber between said outer tube and said inner tube.

15. The double-ended high intensity discharge lamp, as recited in claim 11, wherein said inner tube has two joining portion at two end portions and said outer tube has two brim ends melted to attach at said two joining portion respectively so as to integrate said outer tube with said inner tube together and define said ventilate chamber between said outer tube and said inner tube.

16. The double-ended high intensity discharge lamp, as recited in claim 12, wherein said inner tube has two joining portion at two end portions and said outer tube has two brim ends melted to attach at said two joining portion respectively so as to integrate said outer tube with said inner tube together and define said ventilate chamber between said outer tube and said inner tube.

17. The double-ended high intensity discharge lamp, as recited in claim 15, said luminous tube further comprises at least one electrical member is securely fastened therein and at least a distributor connecting said at least one illuminator with said at least one electrical member to receive power and supply said at least one illuminator.

18. The double-ended high intensity discharge lamp, as recited in claim 16, said luminous tube further comprises at least one electrical member is securely fastened therein and at least a distributor connecting said at least one illuminator with said at least one electrical member to receive power and supply said at least one illuminator.

* * * * *